US011995698B2

(12) United States Patent
Nomula et al.

(10) Patent No.: US 11,995,698 B2
(45) Date of Patent: *May 28, 2024

(54) SYSTEM FOR VIRTUAL AGENTS TO HELP CUSTOMERS AND BUSINESSES

(71) Applicant: Voicemonk, Inc., Sunnyvale, CA (US)

(72) Inventors: Jagadeshwar Nomula, Sunnyvale, CA (US); Vinesh Gudla, Pleasanton, CA (US)

(73) Assignee: Voicemonk, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/465,186

(22) Filed: Sep. 12, 2023

(65) Prior Publication Data
US 2023/0419383 A1    Dec. 28, 2023

Related U.S. Application Data

(63) Continuation of application No. 17/323,287, filed on May 18, 2021, which is a continuation of application
(Continued)

(51) Int. Cl.
G06Q 30/00    (2023.01)
G06F 16/957    (2019.01)
G06Q 30/0601    (2023.01)

(52) U.S. Cl.
CPC ....... G06Q 30/0617 (2013.01); G06F 16/957 (2019.01); G06Q 30/0629 (2013.01)

(58) Field of Classification Search
CPC ............ G06Q 30/0617; G06Q 30/0629; G06F 16/957
See application file for complete search history.

(56) References Cited

U.S. PATENT DOCUMENTS 5,361,201 A    11/1994 Jost et al.
6,446,064 B1    9/2002 Livowsky
(Continued)

FOREIGN PATENT DOCUMENTS

WO    WO-9948088 A1 *    9/1999    .......... H04M 3/4938
WO    2001085685 A1    11/2001
(Continued)

OTHER PUBLICATIONS

Ummuhanysifa, U., and P. K. Nizar Banu. "Voice based search engine and web page reader." International Journal of Computational Engineering Research (IJCER) (2013): 1-5. (Year: 2013).*

Primary Examiner — Matthew E Zimmerman
(74) Attorney, Agent, or Firm — Kumar Maheshwari; Mahesh Law Group PC

(57) ABSTRACT

A system for executing actions based on user input is provided. The system comprises a virtual agent for a software application, wherein the virtual agent is configured to store a correlation between actions available in the software application. Further, the system associates one or more of the actions with one or more tags. The system receives at least an audio input from a user of the software application and uses the input to identify an action desired by the user to be performed among the actions. Further, the system executes one or more actions based on the desired action and the correlation between the actions available in the software application.

10 Claims, 7 Drawing Sheets

Related U.S. Application Data

No. 15/356,512, filed on Nov. 18, 2016, now Pat. No. 11,068,954.

(60) Provisional application No. 62/318,762, filed on Apr. 5, 2016, provisional application No. 62/275,043, filed on Jan. 5, 2016, provisional application No. 62/257,722, filed on Nov. 20, 2015.

(56) References Cited

U.S. PATENT DOCUMENTS

| | | | |
|---|---|---|---|
| 7,457,397 B1 | 11/2008 | Saylor et al. | |
| 7,548,915 B2 | 6/2009 | Ramer et al. | |
| 7,693,757 B2 | 4/2010 | Zimmerman | |
| 7,979,415 B2 | 7/2011 | Shen et al. | |
| 8,036,937 B2 | 10/2011 | Tang et al. | |
| 8,095,419 B1 | 1/2012 | Kapur | |
| 8,156,060 B2 | 4/2012 | Borzestowski et al. | |
| 8,239,206 B1 * | 8/2012 | LeBeau | H04W 4/50 707/769 |
| 8,326,634 B2 | 12/2012 | Di Cristo et al. | |
| 8,650,081 B2 | 2/2014 | Basel et al. | |
| 8,738,377 B2 | 5/2014 | Byrne et al. | |
| 9,087,332 B2 | 7/2015 | Bagherjeiran et al. | |
| 9,292,252 B2 * | 3/2016 | Hardy | G06F 3/167 |
| 9,612,892 B2 | 4/2017 | Schimmelpfeng et al. | |
| 9,679,300 B2 | 6/2017 | Lynch et al. | |
| 10,055,681 B2 | 8/2018 | Brown et al. | |
| 10,102,307 B2 | 10/2018 | Han et al. | |
| 10,127,316 B2 | 11/2018 | Lee-Goldman et al. | |
| 10,187,616 B2 | 1/2019 | Shondel | |
| 10,304,458 B1 | 5/2019 | Woo | |
| 10,475,446 B2 | 11/2019 | Gruber et al. | |
| 10,534,623 B2 | 1/2020 | Harper et al. | |
| 10,769,184 B2 | 9/2020 | Moore et al. | |
| 2007/0100650 A1 | 5/2007 | Ramer et al. | |
| 2008/0189179 A1 | 8/2008 | Marouani et al. | |
| 2008/0294624 A1 | 11/2008 | Kanigsberg et al. | |
| 2009/0254346 A1 * | 10/2009 | Moore | H04M 3/4938 704/260 |
| 2009/0254348 A1 * | 10/2009 | Moore | G10L 15/22 704/260 |
| 2010/0223133 A1 | 9/2010 | Scott et al. | |
| 2011/0258049 A1 | 10/2011 | Ramer et al. | |
| 2011/0313861 A1 | 12/2011 | Lawrence, III et al. | |
| 2014/0100952 A1 | 4/2014 | Bart et al. | |
| 2014/0188552 A1 | 7/2014 | Chan et al. | |
| 2014/0343950 A1 * | 11/2014 | Simpson | G06F 16/9535 704/275 |
| 2015/0039292 A1 * | 2/2015 | Suleman | G06F 40/56 704/9 |
| 2015/0142704 A1 * | 5/2015 | London | G06F 16/90332 706/11 |
| 2016/0063560 A1 | 3/2016 | Hameed et al. | |
| 2016/0071517 A1 | 3/2016 | Beaver et al. | |

FOREIGN PATENT DOCUMENTS

| | | |
|---|---|---|
| WO | 2013006822 A1 | 1/2013 |
| WO | 2014197635 A2 | 12/2014 |

* cited by examiner

SYSTEM FOR VIRTUAL AGENTS TO HELP CUSTOMERS AND BUSINESSES

CROSS-REFERENCE TO RELATED APPLICATIONS

This application is a continuation of pending continuation application Ser. No. 17/323,287 filed on May 18, 2021 of the parent patent application Ser. No. 15/356,512, filed Nov. 18, 2016, which is a Non-Provisional Patent Applications of Provisional Patent Application Nos. 62/257,722, 62/275,043 and 62/318,762, filed Nov. 20, 2015, Jan. 5, 2016 and Apr. 5, 2016, respectively from which priority is claimed, the entire disclosure of said prior application being hereby incorporated by reference.

DESCRIPTION

Description of Related Art

Customers browse through websites or software applications to look for products of interest to them. A customer can use a keyboard to enter keywords into the search box for which the website displays search results corresponding to the entered input. Further, the customer browses through the search results, filters them to select an item and either purchases it or adds it to the cart. In case the customer is interested in different products, they need to go back to the search box and enter a different search query. The same procedure needs to be repeated, which becomes tedious. Further, such websites and software applications are designed to work sequentially. If the customer wishes to add or search two or more items at the same time, it is impossible for them to do so since the customer needs to access different web pages to view different products.

Additionally, with an increase in the dependence of the web, many people now prefer completing a variety of work online instead of going out to physical stores. In physical stores, there are store attendants and employees who can help a customer while they are buying a product. However, when the same product is bought online, no such help is offered by conventional systems. When a customer wishes to place an order or clear doubts regarding a product, they make a call to an organization or a customer representative. Many times, a customer representative may not be available to talk to the customer. Other times, the customer is made to wait for long durations of time till they are connected to a customer representative. In such cases, the customer can feel frustrated due to the bad customer service. Conventional systems do not address this issue, which leads to an increase in time and effort spent by a customer.

Additionally, a customer cannot checkout multiple items in the same action and is forced to do actions in a sequence. Thus, the conventional systems failed to solve the above problems resulting in bad customer experience, which is not desirable. Further, with an increase in the number of consumers shopping online, it is of prime importance to improve customer experience, to increase revenue.

In addition, while customers experience the above discussed problems in their online engagement, brick and mortar stores have their own share of problems. In a brick and mortar store, products are stored in racks spread across the floor of the store. Often, it is difficult to locate the products in the store. Locating the products may require the customers or store assistants to browse through various racks in the store, which results in inefficient utilization of time and resources. In view of the foregoing discussion, there is a need to overcome the above problems and improve customer experience.

SUMMARY OF THE INVENTION

Improved techniques to help customers and businesses become more efficient are needed. To fulfil this need, a system for executing actions based on user input is provided. In an implementation, the system comprises a virtual agent as a third-party application configured to function with the software application, wherein the virtual agent is configured to store a correlation between actions available in the software application. Further, the system associates one or more of the actions with one or more tags. The system receives at least an audio input from a user of the software application, and uses the input to identify an action desired by the user to be performed among the actions. Further, the system executes one or more actions based on the desired action and the correlation between the actions available in the software application.

In another implementation, a matchmaking system is configured to assist a user of an e-commerce software application. The system comprises a virtual agent configured to receive explicit input from the user of the software application. Further, the system uses the explicit input to identify an action desired by the user to be performed and context corresponding to the action. Further, the system executes one or more actions based on the desired action by incorporating the context while executing the one or more actions. Subsequently, the system generates a statement in case at least one of the action desired or the corresponding context are not identifiable based on the explicit input received from the user. The system outputs the statement in an audio format, wherein the statement and the audio is customized based on a profile of the user.

In another implementation, a virtual customer representative system is provided. The system comprises a virtual agent configured to receive audio input from a user. The system uses the audio input to identify an action desired by the user to be performed and a context corresponding to the action. Subsequently, the system enables carrying out of the desired action if the user is identified and the user as identified is authorized to carry out the desired action.

Other objects, features, and advantages of the present disclosure will become apparent from the following detailed description. It should be understood however, that the detailed description and specific examples, while indicating preferred implementations of the present disclosure, are given by way of illustration only and various modifications may naturally be performed without deviating from the present disclosure.

BRIEF DESCRIPTION OF DRAWINGS

Implementations are illustrated by way of example and not limitation in the Figures of the accompanying drawings, in which like references indicate similar elements and in which.

DETAILED DESCRIPTION

In the following detailed description of exemplary implementations of the disclosure in this section, specific exemplary implementations in which the disclosure may be practiced are described in sufficient detail to enable those skilled in the art to practice the disclosed implementations. However, it is to be understood that the specific details presented need not be utilized to practice implementations of the present disclosure. The following detailed description is, therefore, not to be taken in a limiting sense, and the scope of the present disclosure is defined by the appended claims and equivalents thereof Overview A customer using websites and software applications can have better customer experience using virtual agents 100. A virtual agent 100 can speak with a customer in a natural voice. The virtual agent 100 can start with a pleasant greeting in a personalized voice and can ask the customer what they would like to do. The virtual agent 100 can use input from the customer that is in the form of voice, speech, facial expressions, head movement and eye movement inputs. The virtual agent 100 processes the input from the customer, considers different scenarios and presents suggestions to help the customers. Further, the virtual agent 100 presents the customer with one or more options for execution. The customer's chosen option can be executed by the virtual agent 100. Further, the virtual agent 100 can converse with the customer using natural language speech as a customer service representative. Additionally, the virtual agent 100 can answer questions asked by the customer regarding products or services available, and location of products within a commercial establishment.

The virtual agent 100 may be used to execute one or more actions desired by the user based on received user input. The virtual agent 100 may store one or more correlations between actions available in a software application. Further, the virtual agent 100 may associate one or more actions with tags describing the actions. The virtual agent 100 may process user inputs and use the tags associated with actions to identify the action desired by the user. Further, the virtual agent 100 may execute one or more actions based on the user's desired action and the correlation between actions in a software application. An example of actions carried out in a website may be: search, sort, select, compare and submit, among others.

As an example, a virtual agent 100 may identify one or more actions on a software application or a website and associate each action with a descriptive tag. When a user says "show me the latest mobile phones available today.", the virtual agent 100 may understand that the user's desired action is a "search" action. Hence, the virtual agent 100 may execute an action with a tag related to "search", and associate a context of "mobile phones" with the "search" action.

Virtual Agent System

Figure 1:
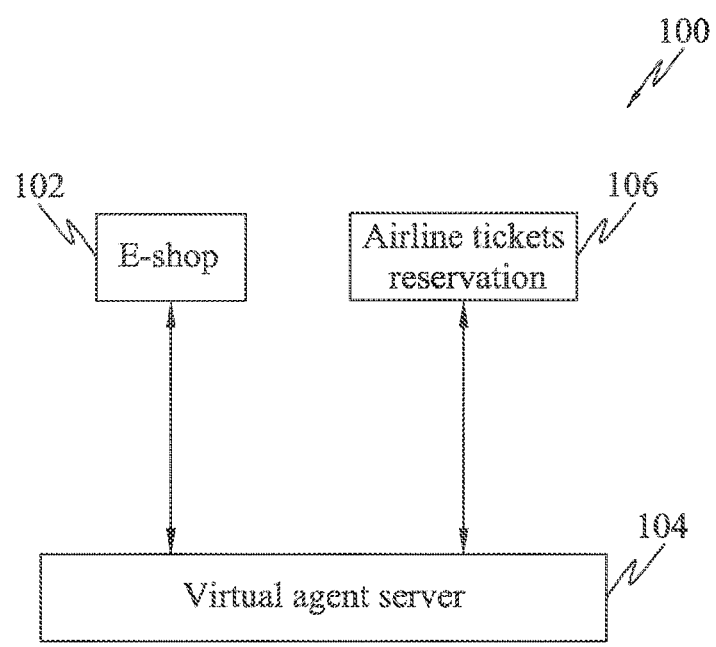
FIG. 1 is an exemplary block diagram illustrating a virtual agent 100 comprising a virtual agent server 104, in accordance with an implementation.

FIG. 1 depicts a diagram illustrating an exemplary architecture of a client-server based virtual agent system 100, in accordance with an implementation. A backend virtual agent server 104 may be coupled to a virtual agent client 202 (shown in FIG. 2) to interact with users. The virtual agent server 104 may interact with various websites or software applications, for example, an e-shop 102. The virtual agent server 104 may complete one or more tasks for the user such as booking appointments, buying tickets or placing orders, among other tasks done through a website or a software application. One example for a software application may be an Airline tickets reservation 106 where the user may instruct the virtual agent 100 to check flight rates or book tickets, among other tasks. Further examples may include buying movie tickets, tickets to theatre shows and concerts, among others.

In an embodiment, the virtual agent is a third-party application configured to interface and function with software applications, such as e-commerce applications, among others. Hence, a small or medium sized e-commerce player can enable his users to use the functionality enabled by the virtual agent by integrating the virtual agent with the eCommerce application, without the need to develop the functionality of the virtual agent specifically for his/her eCommerce application.

In an implementation, the virtual agent server 104 may receive one or more voice, speech, facial, head motion and eye tracking inputs, among others, from a virtual agent client 202 and may understand the inputs using a context understanding module 206. Further, the virtual agent server 104 may prepare a response with speech, voice and emotions using the context generation module 210. Further, the virtual agent client 202 may share the response with the user.

Figure 2:
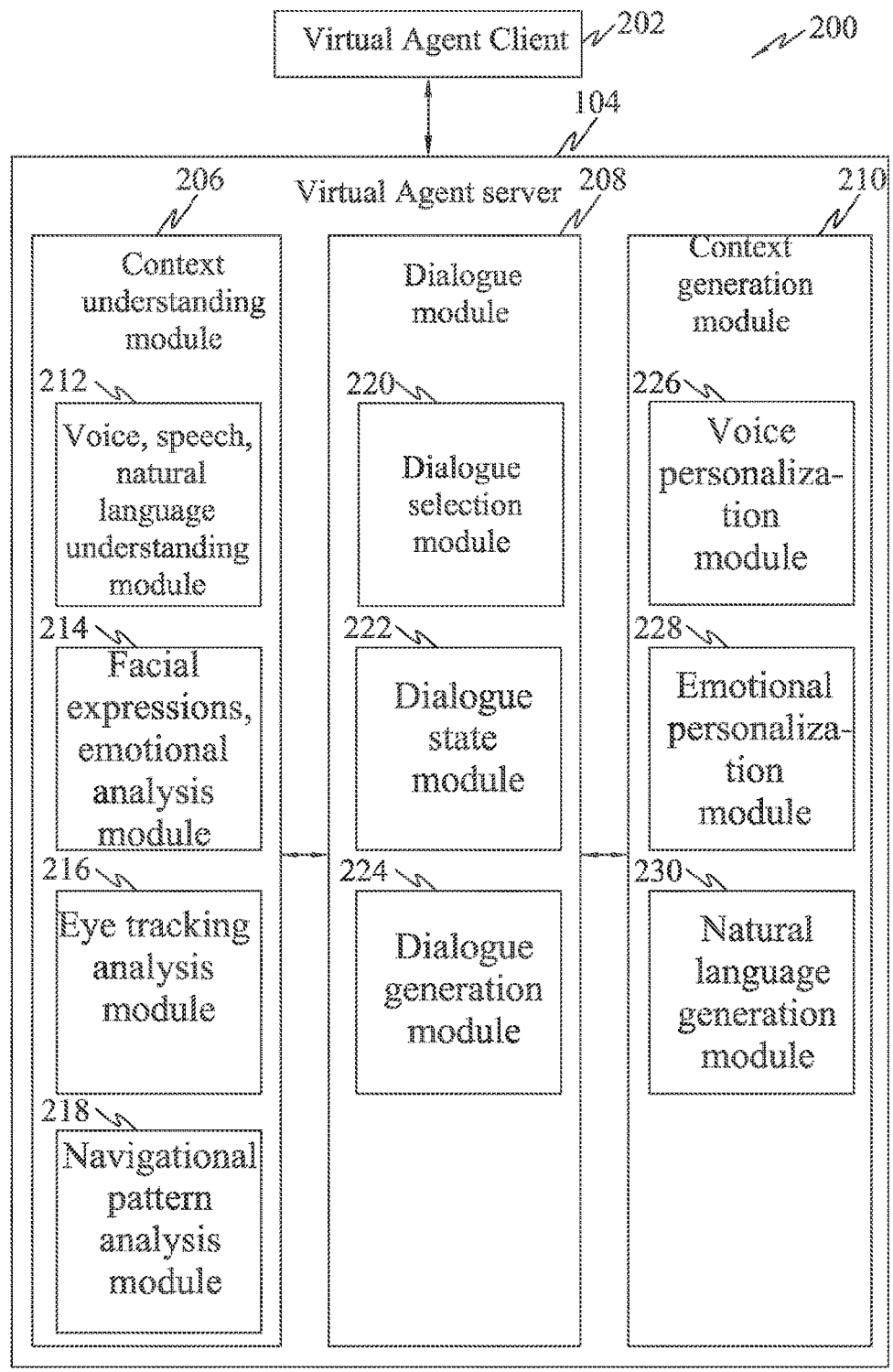
FIG. 2 is an exemplary block diagram 200 illustrating interactions between a virtual agent client 202 and an exemplary virtual agent server 104, in accordance with an implementation.

In an implementation, FIG. 2 depicts a diagram illustrating interactions between a virtual agent client 202 and an exemplary virtual agent server 104, exemplary components of the virtual agent server 104, and interactions between the components of the virtual agent server 104, in accordance with one or more implementations of the present disclosure.

In an implementation, the virtual agent 100 may comprise a virtual agent client 202 which may be coupled to a backend virtual agent server 104 wherein the virtual agent client 202 and the virtual agent server 104 may work together to complete a task of the user.

In an implementation, the virtual agent client 202 may be provided in a website or a software application to interact with users. The virtual agent client 202 present in the browser of the website or the mobile application may be implemented by software. Further, in an implementation, the virtual agent client 202 may be implemented in one of a native, JavaScript or html code, among other coding languages that exist or may exist in the future.

In an implementation, the virtual agent client 202 may start to engage the user in case they open a software application or website. The virtual agent client 202 may enable the input given by the user to be used for determining the context of the user. Further, it may enable execution of one or more actions in the software application or website as requested by the user. These actions may include one or more of a search, viewing an item, a checkout action and filtering results, among others in a retailing context.

In an implementation, the virtual agent 100 may comprise a virtual agent server 104 which may further comprise a context understanding module 206, a dialogue module 208 and a context generation module 210. In an implementation, the virtual agent server 104 may process inputs from the user using context understanding module 206. Such inputs may include one or more of voice, speech, facial, head motion, application navigation, or eye tracking inputs, among others. The dialogue module 208 may keep track of the spoken dialogue conversation between the virtual agent 100 and the user; and may provide a dialogue service to enable spoken dialogue interaction between the user and the virtual agent 100. Further, the virtual agent server 104 may use the context generation module 210 to determine appropriate speech, voice and emotions for the communication to be made by the virtual agent client 202 with the user.

The context understanding module 206 may further include a voice, speech and natural language understanding module 212, a facial expressions and emotional analysis module 214, an eye-tracking analysis module 216 and a navigational patterns analysis module 218.

In an implementation, the voice, speech and natural language understanding module 214 may process the content of the user's speech to understand the inputs and requirements of the user. The voice, speech and natural language understanding module 214 may understand the speech context from the user and determine the user's needs. The context may be derived from explicit inputs given by the user and may correspond to an action desired by the user. Further, the determined context may be incorporated while executing one or more actions on behalf of the user.

The speech context may comprise textual words used by the user in the current session and/or previous "m" sessions. Further, "m" may be manually configured or tuned for a software application using one or more algorithms such as Machine Learning, among others.

In an implementation, the voice, speech and natural language understanding module 214 may assign weights to tokens (individual words) detected in the speech context using Term Frequency Inverted Document Frequency (tfidf) and the recency of the communication session. The voice, speech and natural language understanding module 214 may also assign appropriate weights to words detected in previous "m" sessions and may include them in the current communication session. The speech context may also include one or more explicit inputs or inferences from previous natural conversation sessions which are decayed using recency of occurrence. Further, the output displayed by the virtual agent 100 may depend on the context derived from these explicit inputs using current and previous communication sessions.

In an implementation, the voice, speech and natural language understanding module 214 may also determine a voice context of the user's communication session. The voice context may include one or more of the intensity of speech and frequency of the speech, among others.

In an implementation, the voice, speech and natural language understanding module 214 may use one or more slot filling algorithms to recognize text and interpret the conversation. Further, in case the virtual agent server 104 determines that more slots need to be filled, the dialogue state module 222 of the dialogue module 208 may use the voice, speech and natural language understanding module 214 of the context generation module 210 to ask one or more clarifying questions to the user. This may be done to increase engagement with the user and collect additional information from the user to fill the required slots.

In an implementation, the virtual agent 100 may estimate an age of the speaker from vocal cues. Age-related changes in anatomy and physiology may affect a person's vocal folds and vocal tract; hence, a person's age may be estimated using one or more vocal cues from the audio input comprising the speaker's voice. One or more vocal cues or measures such as jitter, shimmer, and Mel-frequency cepstral coefficients may be used to correlate the user's voice with age.

In an implementation, the context understanding module 206 may use manual rules followed by natural language analysis techniques to understand the verbal feedback of the user.

In an implementation, the facial expressions and emotional analysis module 214 within the context understanding module 206 may process the inputs received from the virtual agent client 202 to determine an emotional state of the user based on the reactions of the user. The facial expressions and emotional analysis module 214 may analyse one or more facial and head motion frames (e.g., sideways, upwards and downwards) of the user and process them by using one or more techniques such as predictive, machine learning or deep learning techniques, among others, to understand emotional reactions of the user.

In an implementation, the eye tracking analysis module 216 within the context understanding module 206 may include an eye tracking system that may receive one or more video recordings of the user from the virtual agent client 202 and process them to track the movement of the user's eyes across the device screen on which the website or software application is running. Further, the eye tracking analysis module 216 may process the tracked eye movements to determine one or more top 'y' positions viewed by the user on the device screen. Subsequently, the virtual agent 100 may decide on one or more courses of action based on these top 'y' positions.

In an implementation, the navigational patterns analysis module 218 within the context understanding module 206 may include a navigation pattern tracking system that may receive inputs of the user's navigation across the website/software application from the virtual agent client 202 and process them to track the user's navigation. Further, the navigational patterns analysis module 218 may process the tracked website navigation to determine one or more items of interest on the website that may have interested the user. Subsequently, the virtual agent 100 may decide on a course of action based on these items.

In an implementation, the dialogue module 208 may help to coordinate one or more actions between the context understanding module 206 and the context generation module 210. The dialogue module 208 may keep track of the spoken dialogue conversation between the virtual agent 100 and the user. Further, the dialogue module 208 may provide a dialogue service that allows spoken dialogue interaction between the user and the virtual agent 100.

In an implementation, the dialogue module 208 may process inputs received from the virtual agent client 202 to understand the context of the communication session with the user by using the context understanding module 206. Further, the dialogue module 208 may personalize user experience using the context generation module 210 after computing top 'n' weighted options of possible actions.

In an implementation, the dialogue module 208 may generate one or more clarification questions to comprehend the user's desired action with the help of the context understanding module 206. In case the dialogue module 208 comprehends the user's intention, it may map the intention to a user action in the application and send it back to the virtual agent client 202 along with a verbal confirmation. The dialogue module 208 may use one or more predictive or machine learning classification and/or ranking algorithms to process the context computed from the context understanding module 206. Further, it may map the context to a list of weighted actions to be executed by the virtual agent 100 on the web site or software application.

In an implementation, an offline process may construct the mapping between actions or states and user commands. The association between the possible actions and the user commands may be determined by crawling the website or software application and determining associations between the possible actions and the user commands. This may be done by using one or more techniques such as pattern matching and/or entity name recognition techniques. This type of mapping may also be built by a manual configuration of rules.

In an implementation, a mapping in the dialogue module 208 may be executed as follows: the dialogue module 208 may determine the user's intention and may query the inventory of the website or software application to determine if it has any actions available for the user which may satisfying the user. The parameters required to complete the query may be manually configured or discovered by crawling the website or software application.

An example of a mapped action named "search action" may be described as follows:

| | |
|---|---|
| Event: | Search action |
| Input Box-Id: | "search-box" |
| Query: | {query output from context output module} |
| Button-Id: | "search-submit" |
| Action: | "click" |
| Voice output: | "I am searching {query output from context input module} for you. Please let me know if you want to change your search criteria." |

In an implementation, the dialogue module 208 may share one or more of the mappings with the context generation module 210. Further, the context generation module 210 may work with the virtual agent client 202 to communicate the voice output in a personalized accent and instantiate actions for the user on the website or software application without the user's involvement.

In an implementation, as an example, the virtual agent 100 may assist the user while they are shopping online by conversing with the user and providing one or more suggestions to them. In this case, the user may have shared a verbal feedback such as "This dress is too dark and expensive". In this case, the dialogue module 208 may first identify that the user is giving feedback based on one or more inputs corresponding to what the user was doing when they gave the feedback and what their previous actions were. These inputs may be determined by using a Hidden Markov model trained offline with feedback from context understanding module 206. Further, upon determining that the user's speech is a feedback dialogue, the dialogue module 208 may label each of the user's words to one or more item characteristics using a Recurrent Neural Network which may be trained offline.

In an implementation, as an example, the sentence "This dress is too dark and expensive" may be processed and understood by the virtual agent 100 as follows: a 'dress' may refer to a type of item, 'dark' may refer to the colour of the item and 'expensive' may refer to the price of the item. Further, upon determining one or more labels in the dialogue, the virtual agent 100 may determine if it has sufficient information needed to process the natural dialogue of the user. This may be done by evaluating it against a feedback natural dialogue slot configuration in the application. Further, in case the virtual agent 100 determines from the feedback from the dialogue module 208 that there is insufficient information to work with, the virtual agent 100 may ask one or more clarification questions such as "is the design of this dress okay?". This may prompt the user to share more information that may then be processed to determine the needs of the user.

In an implementation, the dialogue module 208 may answer one or more questions raised by the user. This may be done by converting vocal questions into text annotating the tokens in the text with part of speech tags and matching the questions into preformatted question formats. Further, the dialogue module 208 may ask one or more clarification questions to the user, in case it determines that all the slots are not filled in the dialogue session for it to act on the user's behalf.

The dialogue service of the virtual agent 100 may be selected using the dialogue selection module 220. Different types of dialogues may be selected based on one or more of context, user personality and user requirements, among others.

In an implementation, the dialogue state module 222 in the dialogue module 208 may use the voice, speech and natural language understanding module 214 to ask one or more clarifying questions to the user to fill any required slots. Further, the dialogue module 208 may hold information corresponding to one or more possible actions for the user using the dialogue state module 222. The possible dialogue states may also be configured manually with weights by a programmer.

In an implementation, the virtual agent 100 may crawl a website or software application to identify one or more outward links, web-forms, and information that may be present in the website or software application. The virtual agent 100 may use pattern matching, hand written rules and one or more machine learning algorithms such as Hidden Markov Model (HMM) and Conditional Random Fields (CRF), among others, for identification of the links and web-forms. The virtual agent 100 may then add an action for each link and/or web form in the dialogue state module 222. These links and web forms may be tagged with one or more keywords and synonyms with the help of manual tagging, offline call and log analysis. This may be done to increase the match percentage related to voice conversations from the user.

In an implementation, as an example, a user may have said "Reserve Holiday Inn hotel", and the virtual agent 100 did not understand the speech. The user may discontinue using the virtual agent 100 and may type "Holiday Inn" into the search box manually to make reservations in the hotel. In such a case, the virtual agent 100 may add a rule for that search action stating that in case the text in the input for the context understanding module 206 has a word similar to "Reserve *", then the user may intend to reserve a hotel and hence the virtual agent 100 may need to send the appropriate action to the virtual agent client 202.

In an implementation, the dialogue module 208 may use previous logs of user interaction with the virtual agent 100 as training data. This training data may be used for building and improving one or more algorithms such as machine learning models and/or predictive algorithms in the context understanding module 206 and the dialogue module 208.

In an implementation, a Recurrent Neural Network may learn from the log data in case the user says "Reserve Holiday Inn hotel" and was not happy with virtual agent 100's response and may issue a Reservation action for "Holiday Inn". In this case, the virtual agent 100 may tag 'Reserve' as an action and 'Holiday Inn hotel' as an input to the reservation action.

In an implementation, the dialog service of the virtual agent 100 may be generated using the dialogue generation module 224. Different types of dialogues may be generated based one or more of context, user personality and user requirements, among others.

In an implementation, the context generation module 210 may further include a voice personalization module 226, an emotional personalization module 228 and a natural language generation module 230.

In an implementation, the context generation module 210 may present the user with top 'n' options to choose in a verbal conversation. The context generation module 210 may determine the possible outputs or actions that the user may be interested in, given the current dialogue state of engagement between the user and the virtual agent 100.

In an implementation, the voice personalization module 226 may personalize the virtual agent 100's voice based one or more of the user's details. The virtual agent 100 may determine one or more user information including age group, gender, information processing speed and style of the user with the help of one or more predictive and machine learning methods. In some cases, the virtual agent 100 may have stored one or more of the user information mentioned above, in a database. Alternatively, one or more of the user information mentioned above may be collected from previous sessions.

After determining one or more user details such as age, gender, location, accent and other user information, the virtual agent 100 may decide to use different customizations and combinations of gender, voice, accent and language to communicate with the user using a plurality of modules to optimize engagement with the user. Different voice outputs may be trained offline for different personality types.

In an implementation, a generic parameterized HMM model for converting text to speech may be customized according to different personality types by asking different personality type persons to record the same text. This model may then be used in a speech synthesis model to generate appropriate sound waves with the right prosodic features for the text customized by the parameters determined during training. To determine the right voice for a user session, the virtual agent 100 may run one or more Collaborative Filtering algorithm and/or predictive algorithms with user's age, under, location, time of the day. Further, the virtual agent 100 may score each voice to choose one which may increase the engagement with the current user.

In an implementation, the emotional personalization module 228 may determine one or more emotions to be used in the dialogue service for the client. The virtual agent 100 may start its speech with a pleasant greeting in a personalized voice. Further, it, may ask the user one or more questions such as what they would like to do, and subsequently present the user with one or more top 'x' options in case the user opens a website or app for a retail store such as AMAZON.

In an implementation, in case the virtual agent server 104 has determined that more information may be required from the user, the natural language generation module 230 in the context generation module 210 may be used to provide questions to the user. This may be done to increase engagement with the user to collect more information to fill the required slots. Further, the natural language generation module 230 may generate appropriate responses during the conversation with the user.

In an implementation, taking an example of a merchant website, the context understanding module 206 may receive image input or speech of the user and may process them to understand the user's verbal, navigational and emotional inputs. Further, the context understanding module 206 may analyse the user's inputs to determine one or more items that the user is interested in. Subsequently, the context understanding module 206 may process the user's inputs to determine one or more parameters such as colour, fit, price and style of items that the user may be interested in. Further, the context understanding module 206 may analyse the inputs of the user, access additional information from the dialogue module 208 and send an output to the dialogue state module. The parameters considered by the context understanding module 206 may be manually configured at appropriate item levels or category levels of the item.

In an implementation, the virtual agent client 202 may communicate one or more inputs of the user to the context understanding module 206 to determine context and reasons for user unhappiness. The context understanding module 206 may process these inputs to determine the extent of user unhappiness and determine further suggestions or possible actions. Further, the virtual agent 100 may use the suggestions to generate various item suggestions for cross selling them to the user.

Figure 3:
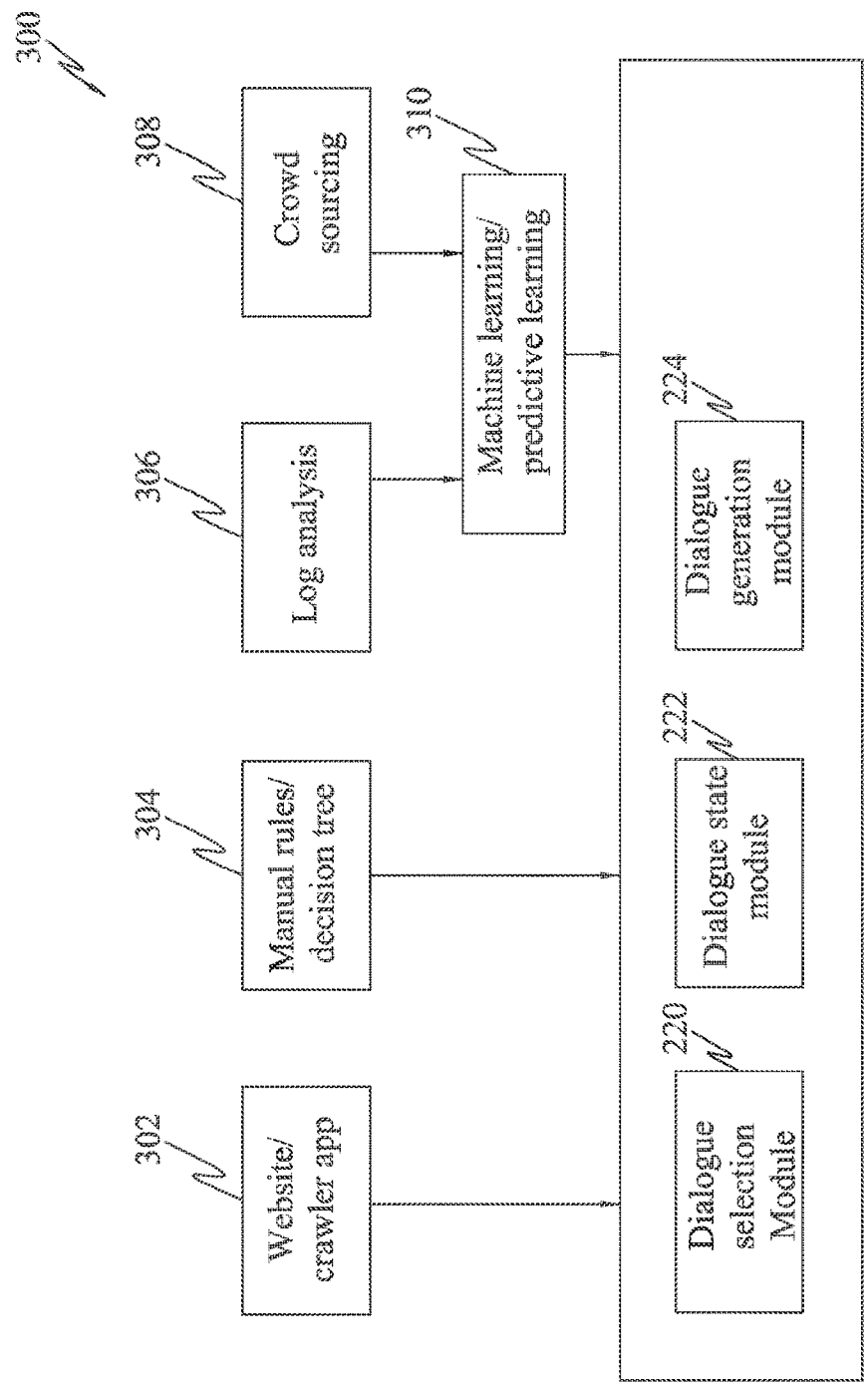
FIG. 3 illustrates schemes and components which may be used to update dialogue states for a dialogue service, in accordance with an implementation.

FIG. 3 depicts a diagram illustrating schemes and components which may be used to update dialogue states for a dialogue service (namely, a service provided to enable spoken dialogue interaction between a user and the virtual agent 100), according to one or more implementations of the present disclosure. In an implementation, one or more of the possible dialogue states may be configured manually with weights by a programmer as per step 304. In another implementation, the web site or app may be crawled as shown at step 302 to determine one or more correlations between one or more of different actions on the webpage, outward links, web-forms, and information, among others, by using one or more methods such as pattern matching, hand written rules and machine learning algorithms such as Hidden Markov Model (HMM) and Conditional Random Fields (CRF), among others. Further, an action for one or more of the link(s) and/or web form(s) in the Dialogue State module 222 may be added. The links and web forms may be enriched with one or more keywords and synonyms though manual tagging, offline call and log analysis, among others, to increase match percentage to voice conversations from the user.

In an implementation, as an example, parsing through the logs the virtual agent may have determined that a person has said "Reserve Holiday Inn hotel", but the virtual agent 100 did not understand the speech. The user gives up on the Virtual Agent 100 and types "Holiday Inn" manually into the search box and reserves the hotel. At step 304, we may add a rule for the search action saying that if the text in input to the NLU module 212 has got a pattern for "Reserve *" then the user intends to reserve a hotel and the Virtual Agent 100 should send appropriate action to the Virtual agent client 202 interacting with the user.

The correlations between the actions may be of different types such as sequential, hierarchical or lateral correlations. As an example, if a user asks "show me toy cars which are red", then the virtual agent 100 will determine that two actions are desired, searching for a toy car and filtering only red ones. Here, search action needs to be executed before filter action, hence this could be an example of a hierarchical correlation. If a user asks "help me book tickets", then the virtual agent 100 may sequentially execute actions to help the user book the start point, destination, time of flight, cost, and so on. In case of a lateral correlation, the user may use an e-commerce web site and ask "Add one pound of bread to my cart and show me different jams", in which case the actions for adding to the cart and showing jam need to be executed laterally. Thus, at least two of the actions on a website which are executed by the virtual agent 100 may be correlated sequentially, hierarchically, or laterally.

In an implementation, a virtual agent 100 may work like a virtual salesman by helping a user when they use a website or software application. The virtual agent 100 may process one or more types of implicit inputs corresponding to the user such as the user's facial expressions, voice, speech, visual and application navigation pattern clues to determine whether the user is unhappy with the browsed item. Further, these implicit inputs may be used to determine the sentiment of the user. The unhappiness of the user may be determined based on one or more of the user's facial expressions, speech, visual and application navigation clues. The virtual agent 100 may determine such details with the help of one or more predictive or machine learning code included in the code of the website or software application; or it may be co-located on the browser or on the virtual agent server 104. Further, the predictive or machine learning codes may process information related to the user including a duration for which the user has looked at the item, navigation patterns on the page, speech cues and vision context, among others, to generate a score for the user's unhappiness called an unhappiness score.

In an implementation, the unhappiness score may be generated by using a manually tuned formula based on the above features. Alternatively, an algorithm such as Linear Regression may be trained on previous interactions and/or crowd sourced data. This algorithm may also be used to generate the unhappiness score.

In an implementation, evaluation code for the unhappiness score may alternatively be stored in a remote server, in which case the virtual agent 100 on the website or software application may pass the context of the user to the remote server. Further, this remote server may send back an unhappiness score to the application. In some cases, the virtual agent 100 may determine that the user may be unhappy with the output results displayed by the virtual agent 100. In this case, the virtual agent 100 may suggest or carry out one or more actions to reduce the unhappiness of the user. These suggestions or actions may be based on some parameters in the software application and any provisions that address such parameters. As an example, in case the user is unhappy with a displayed item, the virtual agent 100 may suggest different sizes, prices or brands related to that item on the website. In an implementation, the virtual agent 100 may suggest alternatives for one or more factors such as price, shape, size, color, brand or manufacturer, among other suggestions which may be used during cross selling a product or a service to a user in a retailing context.

In an implementation, as an example, when the virtual agent 100 takes in an input such as "show me red toy cars" from a user using a software application, the user may directly be directed to a page showing red toy cars. If the user had done this search on his own, he would have first seen results for toy cars, and would then filter them. Thus, in the absence of the virtual agent 100, more than one output page would have been displayed for one or more desire actions.

Figure 4:
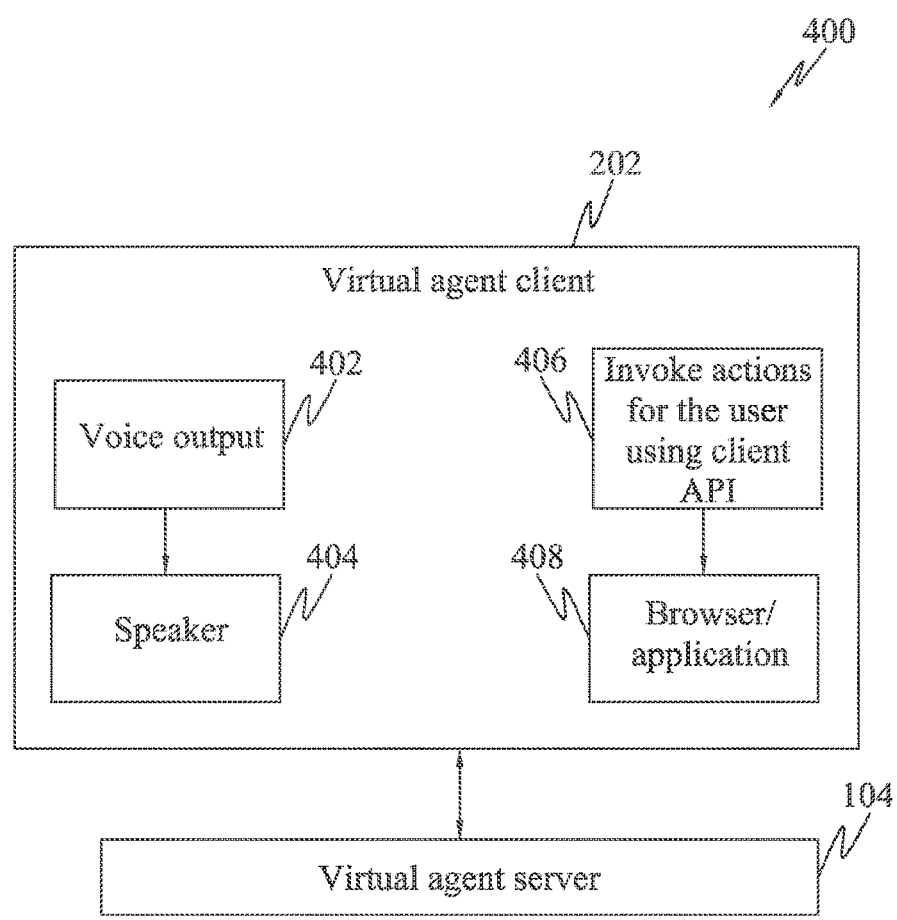
FIG. 4 illustrates interactions between a virtual agent client 202 and a browser in the process of instantiating actions for a user, in accordance with an implementation.

FIG. 4 depicts a diagram illustrating interactions between a virtual agent client 202 and a browser in the process of instantiating actions for a user, according to one or more implementations of the present disclosure. The virtual agent client 202 may invoke one or more actions on behalf of the user using the client application programming interface (API) as shown in step 406. The voice output at 402 may be delivered to the user by using an output device such as a speaker at step 404. For the above mapping, if the user says "Can you show me black shoes?", the virtual agent client 202 Application Programming Interface that is implemented as a JavaScript and HTML snippet on the browser will fill the "search-box" with "black shoes" and click the "search-submit" button.

The virtual agent 100 may receive explicit inputs from the user of the software application and use these inputs to identify an action desired by the user to be performed and identify a context corresponding to the action. Further, based on the desired action, the virtual agent 100 may incorporate the context into the actions and execute one or more actions. Then it may generate a statement in case the action desired or the corresponding context are not clearly identified from the explicit input. Subsequently, the virtual agent 100 may output the statement in an audio format, and customize the audio and statement based on a profile of the user that has been stored by the virtual agent 100.

In an implementation, the virtual agent 100 may communicate with one or more external systems to complete actions requested by the user. Such actions may include a transaction of the user. As an example, for a dining business, the virtual agent 100 may communicate with an order system to place the dining order for the user by using his stored financial details. These may include one or more of a stored credit card, debit card or bank account, among others. The order system may include a Point of Sale (POS) system used by the external system to carry out transactions with the user. As an example, the POS system for a dining place such as a restaurant may have all menu items and their prices stored in a database. When the user orders one or more items from the menu, the relevant information may be retrieved from the database to generate a bill for the user. Further, the order may be placed after the user completes the transaction by paying for the ordered items.

The virtual agent 100 may contact external systems to complete any transaction of the user. In case the virtual agent 100 performs a secure transaction, the virtual agent 100 may be required to validate the user it is communicating with. The virtual agent 100 may compare the voice input of the user with an existing voice biometric of the user. Additionally, the virtual agent 100 may validate the phone number used by the user to ensure that the same phone number is associated with the user. As an example, validation may be required in a scenario where the virtual agent 100 may contact an order system to place the dining order for the user, using their stored credit card. The virtual agent 100 may also validate a user in case of one or more secure transactions related to transferring funds, buying plane tickets and making hotel reservation, among others.

In an implementation, the virtual agent 100 may compute a signature for the user's conversation style. The virtual agent 100 may analyse the user's speech using one or more algorithms. Additionally, as an additional verification, the speech analysis may be based on how the user uses frequently occurring words during the communication session with the virtual agent 100. Further, the virtual agent 100 may analyse the user's conversation patterns from one or more sources of the user's text or speech. The sources may include SMS, e-mail and social media platforms, among others, that are used by the user. Further, the virtual agent 100 may keep track of one or more patterns in the sentences that are frequently used by the user in their conversations.

In an implementation, in case there is a difference between the sentence pattern of the user determined from previous conversations, and the sentence pattern of the user in the current conversation, one or more security measures may be implemented by the virtual agent 100. As an example, the virtual agent 100 may determine that the user generally wishes a person by "Hello {Name}" from the user's conversations in their Email and Chat history. In case the user says "hey {Name}" the current communication session, the virtual agent 100 may tighten the security of the system.

In an implementation, the software comprising the virtual agent 100 may be embedded into the software application or the website of the small business. Alternatively, it may be provided as a separate service.

In an implementation, the virtual agent 100 may be configured to execute one or more actions along with a speech dialogue during the communication session with the user. As an example, the user may give the virtual agent 100 a verbal feedback such as "This dress is too dark and pricey" when they look at a dress they are browsing. The dialogue module 208 may understand this feedback and convert the feedback to a normalized query which the virtual agent server 104 may understand. In an implementation, a visual semantic embedding may be constructed by using one or more of the item characteristics such as description and pixel information of the image the person is looking at. Further, a normalized sentence may be constructed from the user's verbal utterances.

Virtual Agent Configured to Handle Customer Service Calls

Figure 5:
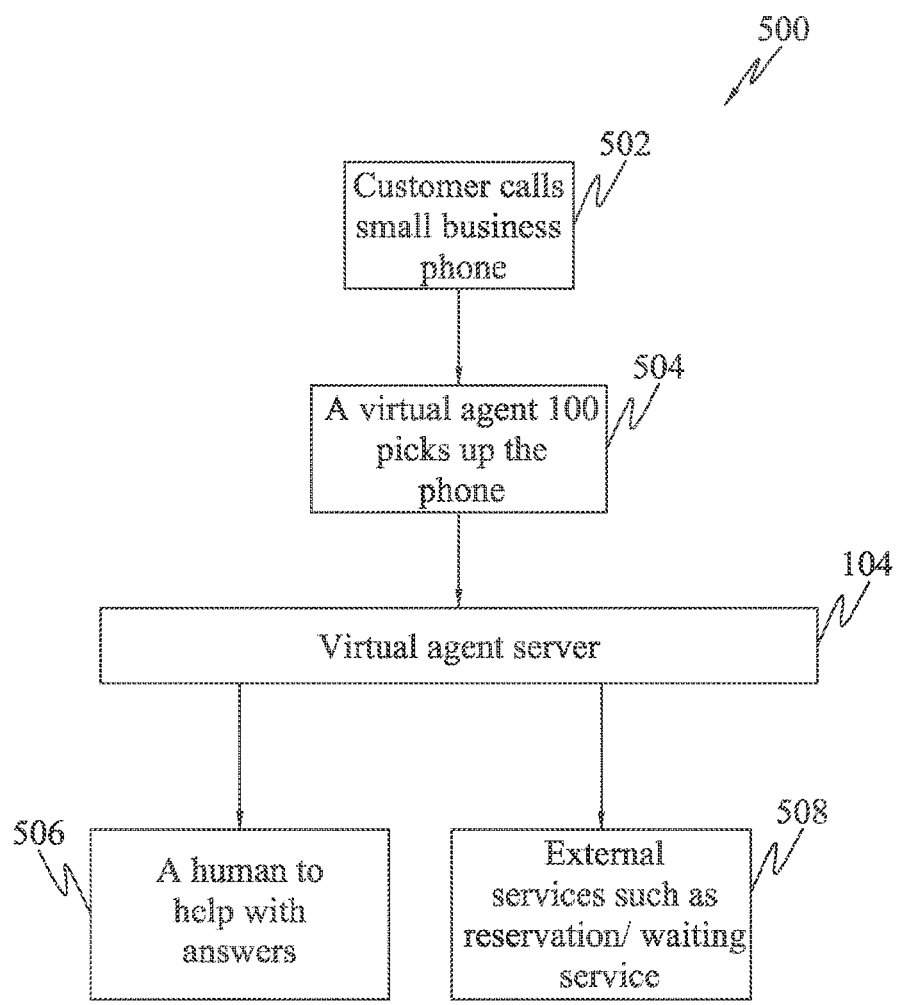
FIG. 5 illustrates a flowchart illustrating the enabling of a virtual agent 100 coupled to a virtual agent server 104 to handle customer service calls, in accordance with an implementation.

FIG. 5 depicts a diagram illustrating one or more exemplary workflows enabling a virtual agent client 202 (coupled to a virtual agent server 104) to handle customer service calls for a small business, per one or more implementations of the present disclosure. The virtual agent client 202 may answer questions about the business and help to book appointments for the businesses. To answer questions about the business, the virtual agent client 202 may rely on virtual agent server 104.

In an implementation, the virtual agent 100 may act as a virtual customer representative system and receive audio or text input from a user. The user may be identified from the audio or text input based on the conversational characteristics of the user, by comparing them with conversational characteristics of existing users. The virtual agent 100 may use the audio or text input to identify an action desired by the user and identify a context corresponding to the action. Further, it may enable the carrying out of the desired action in case the user is identified and authorized to carry out the desired action. Further, as discussed above, the audio output may be based on context derived from the current communication session as well as any previous communication sessions with the user.

In an implementation, as depicted in FIG. 5, the customer may call the phone of a small business for a product or a service as shown at step 502. The virtual agent 100 connected to that phone may receive the call as shown in step 504. Further, in case an uneasiness is detected in the user's voice as discussed below, the virtual agent server 104 may connect the customer to a human customer representative as depicted at step 506. Alternatively, it may connect the customer to an external service such as a reservation or a waiting service as shown at step 508. As an example, a customer calls a local restaurant and tries to place an order. The call will be picked up a virtual agent 100 who wishes the customer with the business name with a personalized voice. This may be done by routing the business phone number to a call centre operated by virtual agents 100.

The virtual agent 100 may generate audio outputs for the user where the content of the audio output depends on the content of the audio input and on information from the website got by crawling. The characteristics of the audio output may be customized on the identity of the user.

In an implementation, the voice context may also be used to determine an uneasiness score. The virtual agent 100 may evaluate a sense of uneasiness in the user's voice and/or text by processing their speech using the speech context. The virtual agent 100 may also evaluate the sentiment of the user during the communication session to detect a sense of uneasiness in the customer voice and try to connect him to a human to for further assistance in case the uneasiness score of the user crosses an uneasiness threshold. The human customer service representative may be able to further assist the user by clarifying his concerns. As an example, the user may say "I am not satisfied with your response. I want to speak to the manager". In response, the virtual agent 100 may detect dissatisfaction or uneasiness in the voice input of the user and may ask the user whether they want to speak with a customer service representative or the manager as requested by the user.

In an implementation, the virtual agent 100 may include one or more predictive algorithms or machine learning classifier algorithms. These algorithms may be trained to detect one or more features in the user's voice input such as a difference in the voice amplitude of the current interaction and previous interaction. The algorithms may also be trained on the repetition of same words or repetition of words which are close when spelled out, among others. Further, the virtual agent 100 may use the uneasiness score to determine whether the user is dissatisfied with the virtual agent 100 to generate one or more courses of action. As an example, the user may say "I'm not understanding what you want are saying." with a different voice amplitude. In this case, the virtual agent 100 may suggest the user to speak with a customer representative.

In an implementation, the voice input may be used to compute an urgency score which may be based on the speech characteristics of the application. The sentiment of the user may correspond to the urgency score. The urgency score of the user for accessing a service may be determined by predictive or machine learning methods using inputs including one or more of rate of speech (words/second), pitch of speech, use of words such as "rush" and "urgent", among others. As an example, a user may say "I am extremely hungry and want food as soon as possible". In response, the virtual agent 100 serving a small business may process the user's speech and determine that the user has used one or more keys words and/or tokens such as "extremely hungry" and "as soon as possible". Further, the virtual agent 100 may talk to the user regarding quickly-made burgers available in the restaurant. The virtual agent 100 may also stress that it is immediately available for pickup, noting that the user wants to eat food urgently.

In an implementation, the urgency score may be used to determine or alter the sequence of actions executed by the virtual agent client 202. An action or suggestion which is urgent for the user may be executed before other actions. In an example, this urgency signal may be used to alter the ordering of the items in the spoken dialogue.

In an implementation, the visual semantic embedding may be constructed using a convolutional neural network. The convolutional neural network may be trained with one or more annotated images from Flickr and ecommerce items from the retailer. The virtual agent server 104 may take the visual semantic embedding, price filters from the client code and may search the catalogue to generate items that may match the user's interest. Further, the results may be displayed to the user and the virtual agent 100 may receive more feedback from the user. This feedback may then be used to suggest further items, until the user completes the transaction flow either through a purchase or by explicitly closing the application. Thus, the virtual agent 100 may act as a salesman for an ecommerce store to increase conversion in the software application or website.

In an implementation, a normalized sentence may be constructed using manual rules. As an example, in case the user says "this dress is too pricey", the virtual agent 100 may convert the sentence to a query on the backend. The query may include information regarding the cost of the product. Further, the virtual agent 100 may collect further information such as current price information and applicable discounts, if any. In case discounts are available, the virtual agent 100 may decrease the price of the item by "X" $, where "X" may correspond to a discount. Subsequently, the virtual agent 100 may communicate the decreased or discounted price to the user.

In an implementation, the virtual agent 100 may be able to perform multiple actions for a user during a single conversation. As an example, in case the user says "Can you place an order for my regular shoes and socks", the dialogue module 208 may send multiple actions to the context generation module 210. The actions may include placing an order for shoes and placing an order for socks. Further, the context generation module 210 may generate relevant responses for the user and the virtual agent client 202 on the browser may initiate the requested actions for the user.

In another implementation, the virtual agent server 104 may receive information regarding web-services for checkout through manual configuration or web service discovery mechanisms. Subsequently, the context generation module 210 may initiate one or more actions on the user's behalf. Further, it may communicate one or more notifications to the user with a customised message to acknowledge the performed actions. As an example, the virtual agent 100 may place an order for shoes and socks for the user as described in the example above. Subsequently, the virtual agent may communicate a notification message to the user which may state "I have ordered shoes and socks for you. You can expect them to be delivered to your home tomorrow."

In an implementation, there may be a software application wherein a user may place a phone call to an organization to purchase a product or a service. Such organizations may include restaurants, supermarkets, dry-cleaners, among other organizations that may be contacted by the user. As an example, a user may call a local restaurant to place an order. The call may be picked up a virtual agent client 202 who may greet the user in a personalized voice with the business name. Further, the virtual agent 100 may provide any assistance needed by the user to complete their request. This may be done by routing the business phone number to a call centre operated by one or more virtual agents 100.

In an implementation, the virtual agent server 104 may rely on offline processes to collect knowledge about the business. The offline component of the virtual agent 100 may crawl one or more relevant small business website to collect data about the offerings of the business. This data may be stored in one or more databases. Further, the virtual agent server 104 may query the data. Subsequently, the virtual agent server 104 may construct one or more natural responses for the user.

In an implementation, the offline process may use one or more techniques such as pattern matching rules, entity name recognition techniques and/or deep learning techniques to extract information about the business and its offerings. Users may also manually add information about the business into the database. The offline component may also convert previous user service call sessions to textual question and answer sessions to extract further information about the businesses. This may be achieved by using regular expression parsing and entity name recognition techniques.

Example Implementation

Figure 7:
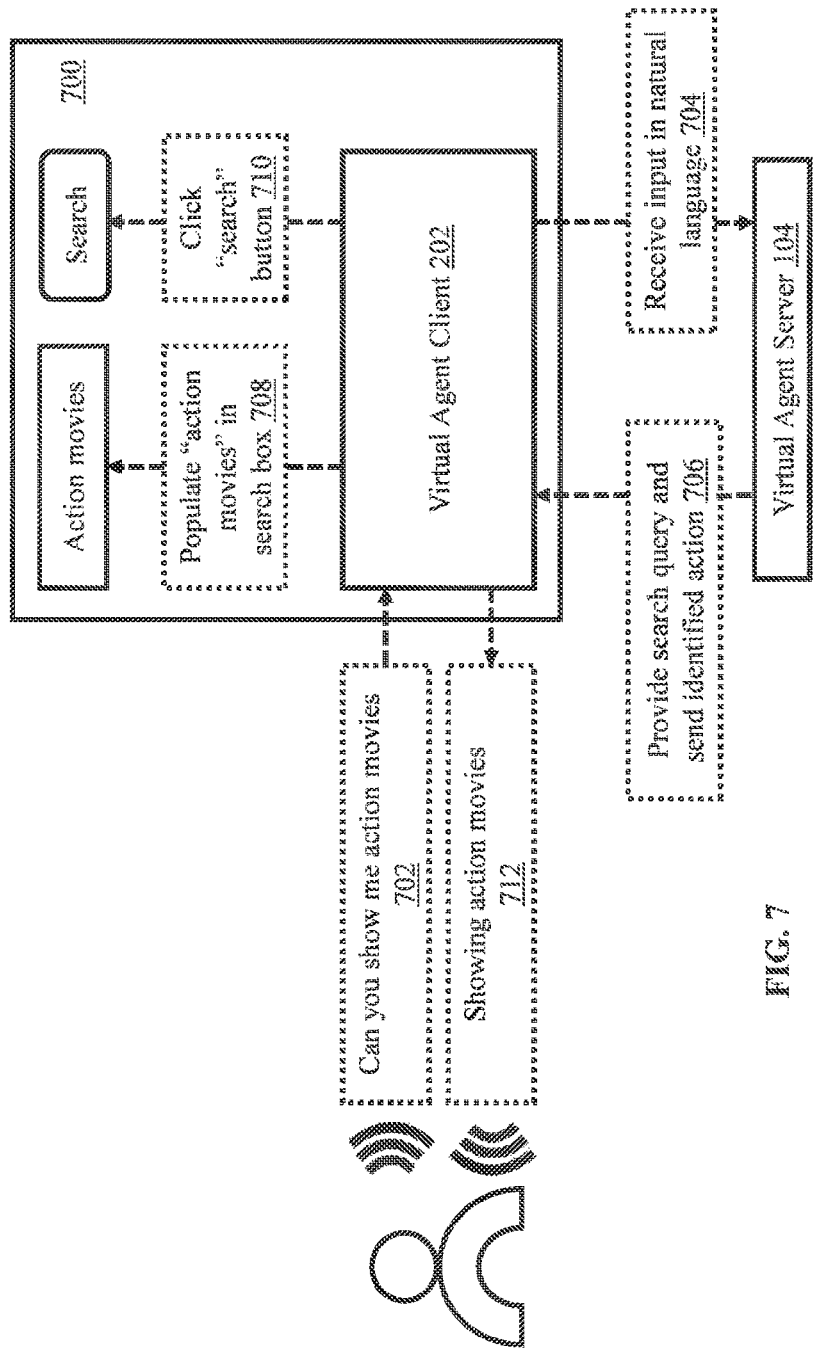
FIG. 7 illustrates working of the virtual agent client 202 and virtual agent server 104 integrated with an e-commerce application 700, in accordance with an embodiment.

Referring to FIG. 7, the virtual agent client 202 and virtual agent server 104 may be integrated with a video streaming mobile application 700. At step 702, a user of the application 700 provides an audio input. The audio input may be provided by speaking into the smartphone. An example of the audio input may be "can you show me action movies". The audio input provided by the user is received by the virtual agent client 202, which is residing on the user's smartphone and integrated with the application 700. It may be appreciated that the input provided by the user is not in a structured format, rather the input is in a natural language format. The virtual agent client 202 sends the user's input to the virtual agent server 104 at step 704. The input may be communicated to the server 104 is the audio format. Alternatively, the client 202 may convert the input into text format, and the text in natural language format may be communicated to the server 104. The server 104 processes the input to determine the intent of the user and identifies the action available in the application 700 that, correlates with the intent. As an example, the phrase "can you show me" is processed to identify that the intent of the user by said phrase is to search. The server 700 also identifies that for a search intent, the corresponding action on the application is to conduct a search action by providing a search query and activating the search button. The server 104 identifies that the search string for the intent is "action movies". It may be noted that, in case the server 104 identifies that the action desired is search, but the string to be used is absent in the input, then the server 104, via the client 102, may probe the user to provide a voice (preferably) input with the string. The server 104, at step 706, sends instruction to the client 202 to activate the search button after populating the search box with "action movies". The client 202, at step 708, populates the search box with "action movies". It may be noted that, although in this example, the box that is visible on the user interface is shown to be populated with the search string, the client 202 may alternatively populate the search string at the backend associated with the search box. Once the search string is populated, the client 202 activates the search button, at step 710. The application 700 may bring up results as a consequence of these actions. The client 202, at step 712, may enable generation of an output (preferably voice) by the smartphone. The output may be, in this example, "showing action movies".

Virtual Agent for a Brick and Mortar Store

As discussed in the background earlier, while customers experience problems in their online engagement, brick and mortar stores have their own share of problems. In a brick and mortar store, products are stored in racks spread across the floor of the store which makes it difficult to locate products in the store. Locating products may require extra effort and time spent by the customers or store assistants, which results in inefficient utilization of time and resources.

A user may go to a retail store and have a question about the exact location of an item. The user may open a software application or browser on their phone which includes a virtual agent 100 to find the location and route. The user may ask the virtual agent 100 "Where are the apples?". The virtual agent 100 may receive and process the customer's question to determine and share the required aisle information. Further, the virtual agent 100 may guide the user to the item's location using one or more route finding algorithms including Dijkstra's algorithm.

In an implementation, the virtual agent 100 may further include an image capturing device like a camera to take one or more images of items in a retail store. The virtual agent 100 may further include a processor to associate a set of location coordinates to one or more of the images that are captured by the camera. Further, it may associate at least one tag with that image, and receive an input from a user who is requesting for the location of an item. The processor may specify the location of the item within the retail store based on the associated tag and the set of coordinates associated with the captured images.

In an implementation, the camera may be mounted on a land vehicle like a robot or an aerial vehicle like a quadcopter or drone. The vehicle may travel around the retail store while the camera captures images of the items in the store. The vehicle may be configured to traverse at preconfigured times, or upon initiation by a user.

Figure 6:
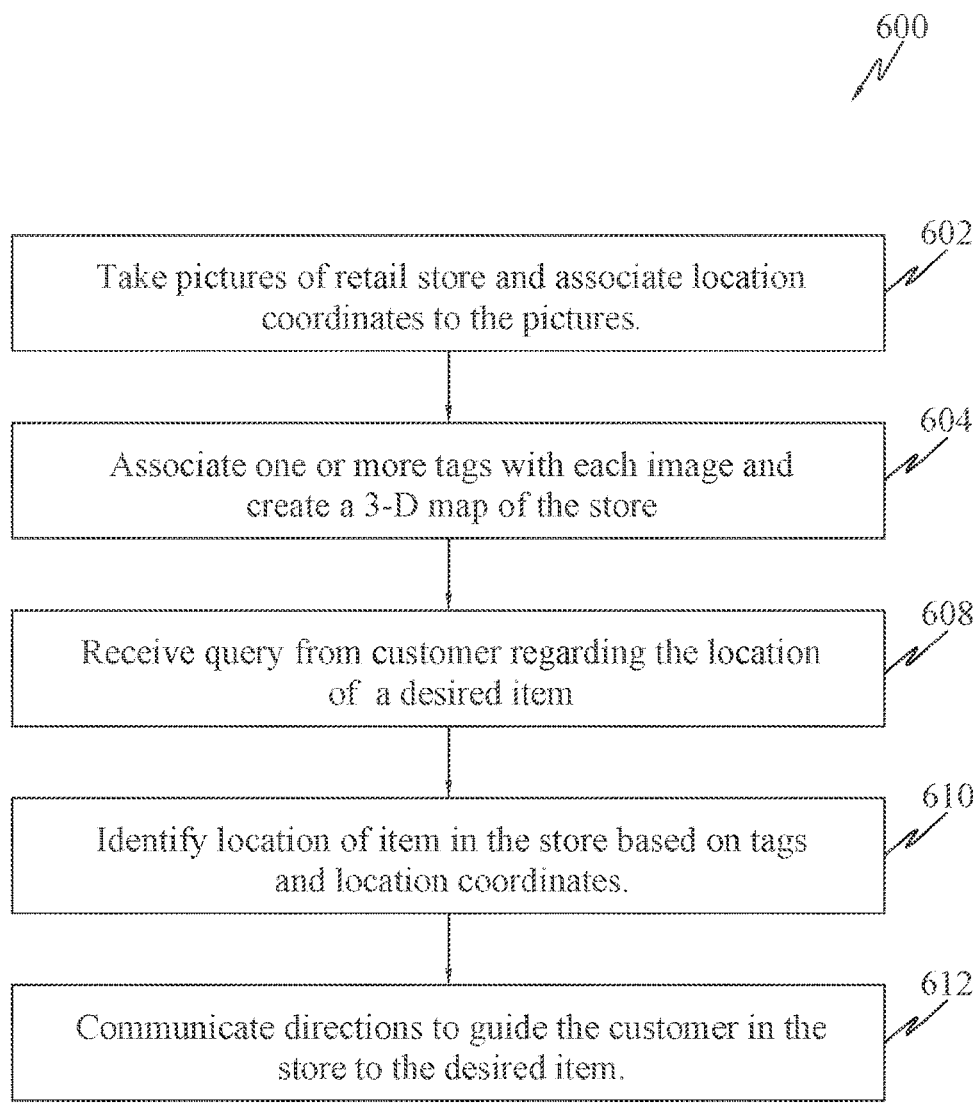
FIG. 6 illustrates a flowchart 600 illustrating a virtual agent 100 helping a user in finding a physical route, in accordance with an implementation.

FIG. 6 depicts a flowchart 600 illustrating a virtual agent 100 helping a user in finding a physical route, in accordance with an implementation. In step 602, the camera may take one or pictures of items in the retail store. Further, the virtual agent 100 may associate one or more location coordinates to each of the pictures taken by the camera. The virtual agent 100 may associate each picture with one or more tags relevant to the picture. Further, the virtual agent server 100 may create a three-dimensional map or representation of the store as shown at step 604. Subsequently, the virtual agent 100 may communicate with a user and receive a query from the user regarding the location of one or more items desired by the user as shown at step 606. The virtual agent may use the associated tags and location coordinates to determine the position of the user's desired item as shown in step 608. Further, the virtual agent 100 may communicate with the user to provide directions to the desired item, as shown at step 610.

In an implementation, to give the user the location of the item, the virtual agent 100 may create a 3-dimensional representation of the retail store, and a map of x, y, z coordinates for each item, using an offline program to process the captured images. This may be done by an autonomous or semi manual quadcopter with a camera mounted on it. The quadcopter may take images of scanned items as it flies through the retail store, recording a set of three coordinates, namely, x, y, z coordinates of the positions of the item. The three coordinates may also be provided with respect to the layout of the retail store. The recorded image may be tagged with a set of coordinates based on the coordinates of the camera at the time of capturing the image. After recording the images and their x, y, z coordinates, a clustering algorithm such as k-means may be run on the characteristics of the images to group them and to generate a representative image position for the group. The quadcopter may run across the retail store multiple times to ensure maximum coverage of the inventory and increase accuracy of the positions for the items. The items in an image may be identified by the processor which may add more than one set of coordinates to a captured image based on the location of the identified items within each captured image.

In an implementation, the processor may identify items in a captured image and may add one or more tags to the image based on the identified items. The processor may use one or more images of items already stored in a database for comparison while identifying one or more items. The database may include one or more tags for one or more items in the retail store. One or more textual annotations for the images may be added by manual input or a combination of machine learning and predictive algorithms after determining the positions of the images. A combination of convolutional neural networks and recurrent neural networks may be used to generate a generic verbal description of the items in an algorithm implementation. The models may be trained on a retail data set comprising images and their textual descriptions collected through crowd sourcing methods to increase the accuracy of these models. The retailers generally group items in certain locations. The offline program after capturing the items may construct a hierarchy grouping for the items. The data for offline grouping may be generated manually or the information may be gathered by querying databases. As an example, let us say a retail salesman starts the quadcopter to scan the images every 2 days. The quadcopter scans the images of the items, aisle numbers and uses the image to textual algorithms to come up with a representation of items and their x, y, z coordinates in the store. The images and/or annotations may be used to query the retailer catalogue using image match and text match methods to get more metadata for the item.

In an implementation, this metadata may be parsed to extract the broader category hierarchy of the item and other metadata information such as synonyms for the item. The broader category metadata may be added as a data element which may be, queried by the virtual agent 100 to answer queries about the item.

In an implementation, the processor may specify the location of an item with respect to a reference location in the store. The reference locations may include one or more static locations such as a door, an entry, exit, or one or more dynamic locations such as a temporary shelf or a current location of the user. As an example, after generating the position map for each of the retail item, the virtual agent 100 of the retail store may welcome a customer and ask them what they require. The virtual agent 100 may help the customer by answering one or more questions related to price, brand and availability of an item, among others, by looking up the retail stores database. In case the customer asks the virtual agent 100 to take them to the exact location where they may find a certain item, for instance "strawberry jam", the virtual agent 100 may use the three-dimensional Map of the items and descriptions that it constructed using the quadcopter, to find the location of the item and may guide the customer to the item's location from the customer's current position. It is to be noted that the three-dimensional Map of item and location information may be manually added into the database.

In an implementation, ultra-wideband technology may be used to get centimetre resolution for recording positions of the items and position of the shopper, to increase the accuracy of the location systems. The three-dimensional model of aisles and items may then be used to guide the customer by using a route-finding algorithm.

The present disclosure takes into consideration the preferences of users and generates suggestions which may be suitable to the user(s). Additionally, the system helps in suggestion and selection of products on a website or software application. Further, the system helps in speaking with customers and executing their orders. The system also helps customers to locate items in a brick and mortar store. Thus, the present disclosure as discussed in this document with respect to different embodiments will be advantageous at least in optimizing the process of selection of products and execution of actions of a user. Further, it is advantageous in providing better user experience and decreasing time and effort required by users. Additional advantages not listed may be understood by a person skilled in the art considering the embodiments disclosed above.

It shall be noted that the processes described above are described as sequence of steps; this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments; it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present disclosure will no doubt become apparent to a person of ordinary skill in the art after having read the foregoing description. It is to be understood that the phraseology or terminology employed herein is for the purpose of description and not of limitation. It is to be understood that the description above contains many specifications; these should not be construed as limiting the scope of the disclosure but as merely providing illustrations of some of the personally preferred embodiments of this disclosure. Thus, the scope of the disclosure should be determined by the appended claims and their legal equivalents rather than by the examples given.

What is claimed is:

1. A system configured to execute actions based on user input, the system comprising a virtual agent comprising a virtual agent client and a virtual agent server for an application, wherein the virtual agent is disposed to be configured to function with the application, wherein the virtual agent server is configured to:
   receive an audio input from a user of the application;
   identify among a plurality of actions, using the audio input, a desired action by the user to be performed;
   execute at least one of the plurality of actions;
   wherein the virtual agent client and server are collectively configured to:
   store, in the virtual agent server, a correlation between one or more actions available in the application, wherein the one or more actions available in the application comprise one or more of: search, sort, select, submit, or compare;
   associate the one or more actions available in the application with one or more tags;
   determine, by crawling the application, at least one input box and at least one submit button in one or more web-forms associated with the one or more actions available in the application;
   execute an action from the one or more actions available in the application, based on the desired action, the correlation between the one or more actions available in the application, and by executing a code snippet in the virtual agent client to fill out the input box and click the submit button; and
   display an output page to the user based on the executed action.

2. The system according to claim 1, wherein the virtual agent is configured to extract the correlation between the one or more actions available in the application by crawling through the application.

3. The system according to claim 1, wherein one or more of the actions of search, sort, select, submit, or compare, are initiated by the virtual agent.

4. The system according to claim 1, wherein the virtual agent is further configured to carry out natural language processing on the audio input and determine a context corresponding to the desired action.

5. The system according to claim 4, wherein the virtual agent is further configured to incorporate the context while executing the one or more actions available in the application.

6. The system according to claim 1, wherein the correlation between the one or more actions available in the application is at least one of sequential, hierarchical or lateral.

7. The system according to claim 1, wherein at least two of the executed plurality of actions have any one of a sequential correlation, a hierarchical correlation or a lateral correlation.

8. The system according to claim 1, wherein the correlation between the one or more actions available in the application is at least one of sequential, hierarchical and lateral.

9. The system according to claim 1, wherein at least two of the executed plurality of actions have any one of a sequential correlation, a hierarchical correlation and a lateral correlation.

10. The system according to claim 1, wherein one or more of the actions of search, sort, select, submit, and compare, are initiated by the virtual agent.

* * * * *